July 7, 1936.  G. MEZ  2,046,524

MECHANISM FOR TYPEWRITER CALCULATING MACHINES

Filed Nov. 11, 1929  7 Sheets-Sheet 1

Fig.1

G. Mez
INVENTOR

By: Marks & Clerk
ATTYS.

July 7, 1936.  G. MEZ  2,046,524

MECHANISM FOR TYPEWRITER CALCULATING MACHINES

Filed Nov. 11, 1929  7 Sheets-Sheet 5

G. Mez, INVENTOR

By Marks & Clerk, Attys.

July 7, 1936.  G. MEZ  2,046,524

MECHANISM FOR TYPEWRITER CALCULATING MACHINES

Filed Nov. 11, 1929   7 Sheets-Sheet 7

Patented July 7, 1936

2,046,524

UNITED STATES PATENT OFFICE 2,046,524

MECHANISM FOR TYPEWRITER CALCULATING MACHINES

Gustav Mez, Dahlem, near Berlin, Germany, assignor to Mercedes Buromaschinen-Werke Aktiengesellschaft, Benshausen, Germany Application November 11, 1929, Serial No. 406,475
In Germany November 12, 1928

12 Claims. (Cl. 235—59)

This invention relates to mechanism for typewriter calculating machines and the like in which there is a carriage return means, clearance sign printing means and pick-up means for the crossfooters, all controlled by the carriage movement.

According to the invention means are provided whereby when rendering the carriage escapement means inoperative, the carriage return means, the clearance sign printing means and the pick-up means for the cross footers are simultaneously and automatically rendered inoperative together or only partially according to which member renders the carriage escapement means inoperative.

In this manner, when moving the paper carriage by depression of the carriage release key or the tabulator keys, the carriage return means, the clearance sign printing or the pick up means for the cross footers are prevented from being set in operation which would give rise to damage of the machine or errors in calculation or the like.

The carriage release lever is combined with the mechanism for rendering all of the aforesaid means inoperative while during the movement of the carriage by the decimal tabulator key only the carriage return and clearance sign printing means are rendered inoperative whereby when depressing the decimal tabulator key and subsequently striking a calculating key errors are avoided.

The mechanisms heretofore known had also the disadvantage that when not using the totalizers, which control the clearance sign printing means, for instance, the crossfooters, an impression of the clearance sign was possible when the cross footers were inoperative.

This disadvantage is obviated according to the invention in that when rendering the cross footer or the pick-up means for the same inoperative, the clearance sign printing means is simultaneously and automatically rendered inoperative.

With these and other objects in view, which will be apparent as the description proceeds, a detailed description of the preferred embodiment of the invention is set forth below and claimed in the appended claims.

Several constructional forms of the invention are shown by way of example in the accompanying drawings.

The description of the invention proper will be preceded by a brief explanation of the operation of the typewriter calculating machine fully described in U. S. Patent Number 1,862,240.

Figures 2, 2A, 10:
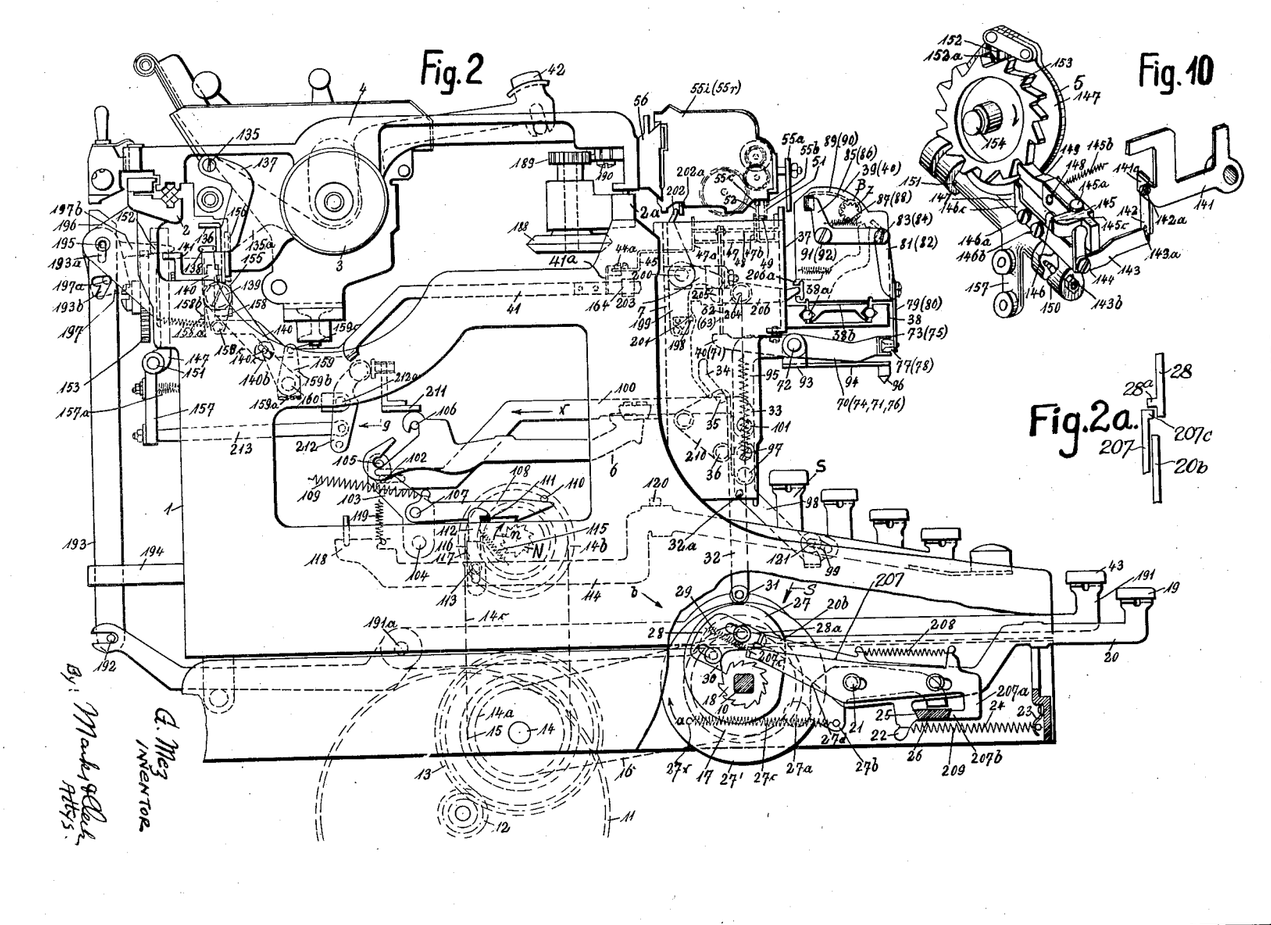
Figure 2 is a side elevation of Figure 1 viewed in the direction of the arrow "A".
Figure 2a shows a fragmentary view of a certain position of the coupling controlling means in the direction of the arrow $s$ in Fig. 2.
Figure 10 shows in perspective the escapement mechanism with fixed and stepping dog therefor.

I is the frame of the typewriter calculating machine and the carriage 4 carrying the platen 3 is slidably arranged on the rails 2 and 2a (Fig. 2). By means of the carriage pulling spring not shown, the carriage 4 is urged constantly (Fig. 1)

from right to left and when striking a type lever 6 against the platen 3 the carriage 4 is released to move one step to the left by the escapement 5 shown in Figure 10.

There is provided at the front of the typewriter the rear wall 7 of the actuator which carries all the counting mechanisms while the driving shaft 10 for operating the actuator is mounted in the two side walls 8 and 9 (Fig. 1) of the frame 1. The said driving shaft 10 is constantly rotated in the direction of the arrow "a" by the constantly running motor 11 through the toothed wheels 12 and 13, the shaft 14, a sprocket wheel 15 secured thereto, the chain 16 and the sprocket wheel 17 arranged on the shaft 10 itself.

The ratchet wheel 18 is fixed to the shaft 10 and rotates therewith. Such a ratchet wheel 18 is provided for each of the ten calculating keys. The calculating key levers 20 are pivotally mounted at 21 on the machine frame and are normally maintained in their position (Fig. 2) by the springs 24 engaging at one end the hook 22 of the lever 20 and at the other end the stationary hook 23. The abutment or stop 26 contacting the lug 25 limits the pivoting action in one direction. If the key 19 is depressed, the lever 20, being rocked on its pivot 21 clockwise, will release with its rearwardly extending member 20b the pawl 28 which is slidably arranged on the cam disk 27 which is loosely mounted on the shaft 10. The said pawl 28 therefore moves in the direction of the arrow b under the action of the compression spring 29 acting on the pawl, and the lug 30 upon said pawl, engages the constantly rotating ratchet wheel 18.

As is readily obvious, the cam disk 27 corresponding to the depressed key will thereby be coupled with the ratchet wheel 18 and the shaft 10 respectively for a single revolution. Consequently, the counting slide 32, which comes in contact with the cam disk 27 by means of a roller 31 moves downwardly first under the action of its engaging spring 33 and then upwards again by the rotation of the cam 27. The slot 34 of the counting slide 32 corresponding to the value of the depressed key acts on the rod 35 of a rocking frame secured to the rotatably mounted shaft 36 whereby the shaft 36 is turned an amount in conformity with the depressed value. There is mounted on the shaft 36 the well known segment, which is designated 27 in the aforesaid U. S. Patent No. 1,862,240 and which transfers the amount over the one way ratchet gear, and the direct or reversing gear train (also fully described in said U. S. patent) to the totalizers and cross footers relative to addition and subtraction respectively.

In order to maintain the cam disk 27 in its normal position shown in Figure 2, the cam is secured to a disk 27' on which is rotatably mounted a roller 27a on the opposite side of the cam 27. The said roller cooperates with a lever 27b which is also pivoted at 21 and in the normal position of cam 27, is always kept in contact with the roller 27a by a spring secured to the lever and also at 27x on the machine frame. Since the end of the lever 27b away from the roller 27a does not bear against the member 26, the cam disk 27 will always be urged in the direction of the arrow a by the spring 27c acting through the lever 27b, the roller 27a and the disk 27' while the rotation of the cam disk 27 is prevented by the lug 28a of the pawl 28 coming in contact against the key lever end 20b of the lever 20 and consequently the cam disk 27 is maintained in its normal position.

Figure 1:
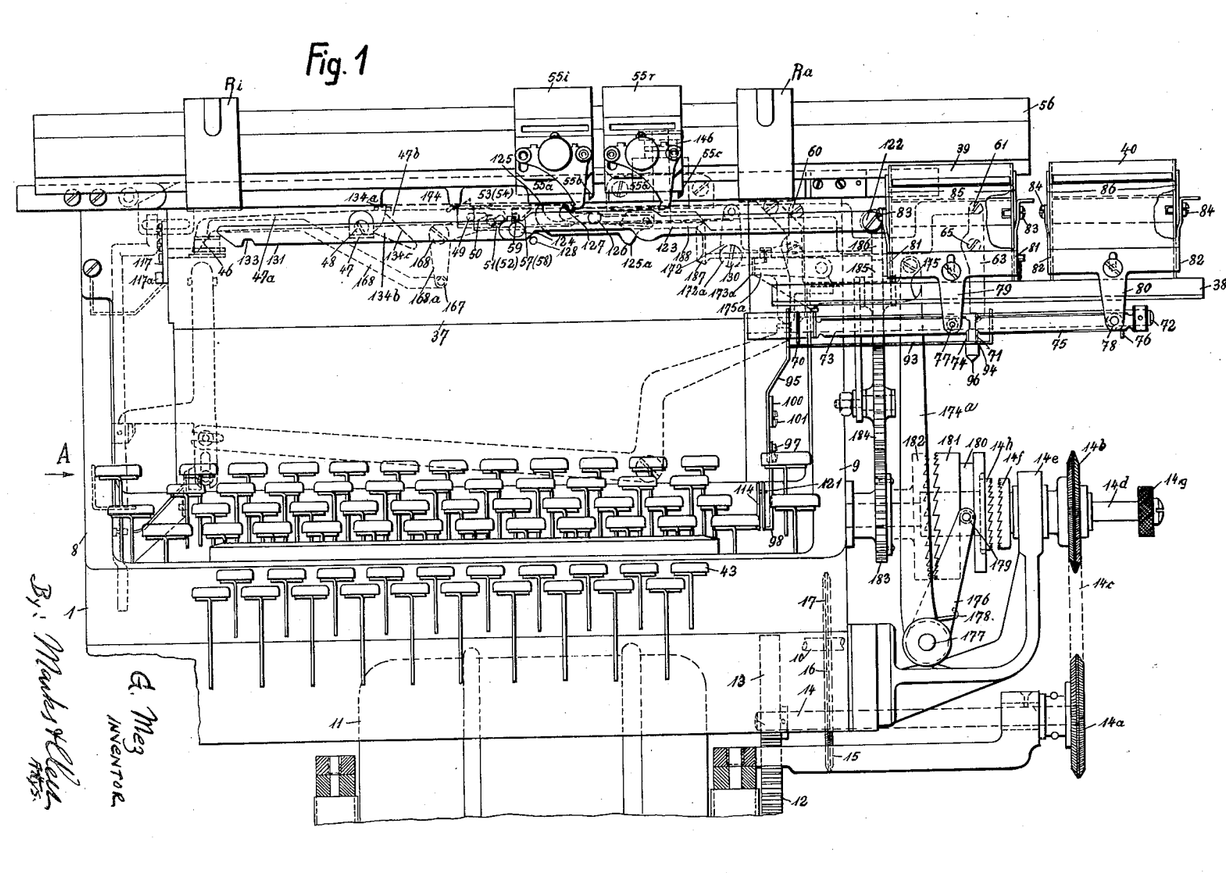
Figure 1 is a front view of a power driven typewriter calculating machine having two cross footers. wherein the most suitable constructional form of the invention is shown.

There is secured to the front wall 37 (Fig. 2) of the machine frame 1 covering the calculating mechanism a bracket 38 wherein by means of balls 38a a carriage 38b (Fig. 12) is slidably mounted on which the two cross footers 39 and 40 are secured. There is secured to the carriage 38b a pin 38c with which a spring 38d engages which is suspended or hooked in with its other end by a pin 38f secured to the cross piece 38e of the bracket 38. By means of the spring 38d the carriage 38b is pulled against the cross piece 38e of the bracket 38 whereby its normal position, as shown in Figs. 1 and 12, is established.

There is connected to each of the two cross footers 39 and 40 a controlling mechanism for the clearance sign printing means, which will now be fully described.

The lug or flap 41a is riveted to the rod 41 (Figs. 2 and 3) which as hereinafter elucidated is connected to the carriage release lever 42 and the tabulator key 43. The said lug or flap 41a acts on the lug or projection 44 of the lever 45 adapted to pivot on the machine frame 1 by means of a screw 44a. The lever when pivoting clockwise acts on the beveled portion 46 of the two-armed lever 47 which comprises the arms 47a and 47b and is adapted to rotate on the axle 48 mounted in the machine frame.

A spring 47d engages with the lug or flap 47c of the lever 47 and maintains the two-armed lever 47 in connection with hereinafter described members in the normal position shown in Figures 3 and 4. A pin 49 is riveted to the free end of the lever arm 47b and extends through slots 50 of the two levers 51 and 52. There are formed on the said two levers 51 and 52 projections or lugs 53 and 54 which cooperate with the cams 55b and 55c (Figs. 1, 4 and 5) of the totalizers 55i and 55r mounted on a rail 56 (Fig. 13) which is fixed by means of screws 56a, 56b to the well known carriage front rail. Triangular grooves each having a bevel edge 57 and 58 are also provided in the levers 51 and 52, and a pin 59 secured to the machine frame 1 extends into the said recesses. The levers 51 and 52 are secured by means of screws 60 and 61 to the levers 62 and 63. It is obvious from Figure 3 that by means of the triangular perforations and the pin 59 as well as the elements 50, 49, 47 and the spring 47d, the levers 51 and 52 are maintained in their horizontal normal position shown in Figures 3 and 4.

The levers 62 and 63 are connected at 64 and 65 to the machine frame and are actuated clockwise by tension springs 66 and 67 (Fig. 3) attached to the pins 68 and 69, the normal position of the levers 62 and 63 being maintained by means of the coaction of the triangular grooves with the pin 59. The levers 70 and 71 (Figs. 1, 2, 3 and 8) are adapted to pivot freely on an axle 72 below the bracket 38 and cooperate with the levers 62 and 63.

By means of a U-rail 73 the lever 70 is connected at its forwardly extending free end (Figs. 1 and 8) to a lever 74 rotatably mounted on the axle 72. To the U-rail 75, levers 71 and 76 are secured which are rotatably mounted on the axle 72.

By means of rollers 77 and 78 (Figs. 1 and 2) the said U-rails 73 and 75 are slidably connected to the slides 79 and 80 Fig. 12 adapted to move vertically on the walls of the cross footers 39 and 40. Each slide 79 and 80 has two upwardly extending members 81 and 82, which are connected by means of the screws 83 and 84 to members 85 and 86 of the rake-like rails 89 and 90 actuated by springs 87 and 88 Figure 2. The rails 89 and 90 are adapted to pivot on the screws 91 and 92 on the side walls of the cross footers 39 and 40 and cooperate with the numeral gears Z which have in the known manner a shortened tooth on the part corresponding to the zero position of the totalizer wheels B. In Fig. 12 the totalizer wheels B are shown close together for the sake of simplicity while there is actually a space between all of them for the toothed wheels Z secured to them and consequently an engagement of the rails 89 and 90 between the totalizer wheels B is also possible.

Figure 16:
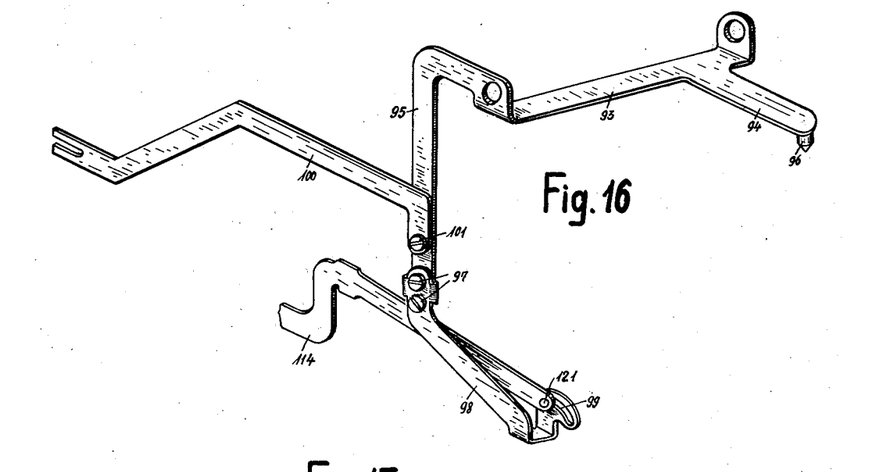
Figure 16 shows in perspective the clearance sign printing means.

A two-armed lever comprising the bridge 93 (Figs. 8 and 16) and the arms 94 and 95 is also rotatably mounted on the axle 72. The arm 94 is provided with a knob 96 and the arm 94 may be actuated by the lever 74 (Figs. 1, 2 and 8) of the U-rail 73 as well as by the arm 71 of the U-rail 75. By means of the screws 97 a lever 98 is secured to the downwardly extending arm 95 (Fig. 1) the lower end of the said lever 98 being provided with a cam slot 99. The lever 100 is pivotally connected to the lever 95 by means of the screw 101, the other end being bifurcated and enclosing a pin 102, which is secured in the known intermediate lever 103 (Fig. 2) of a type lever. The intermediate lever 103 is adapted to rock on the axis 104 and is connected by its pin 105 to a type lever 6 rotatably mounted on an axis 106 and carrying the clearance sign printing type.

A pulling hook 108 is connected to the intermediate lever 103 by a pin 107 and is constantly urged by a tension spring 109 about its pin 107 counter-clockwise and abuts against an abutment 110 whereby its normal position is maintained. There is formed on the pulling hook 108 a lug or projection 111 which cooperates with a pawl 112. This pawl 112 is mounted by means of a pin 113 on the key lever 114 and is urged by a tension spring 115 in such a manner that it bears with its lug 116 against a projection 117 upon the key lever 114. The key lever 114 pivots at 118 and is maintained in its normal position by a spring 119 and an abutment 120.

Figure 17:
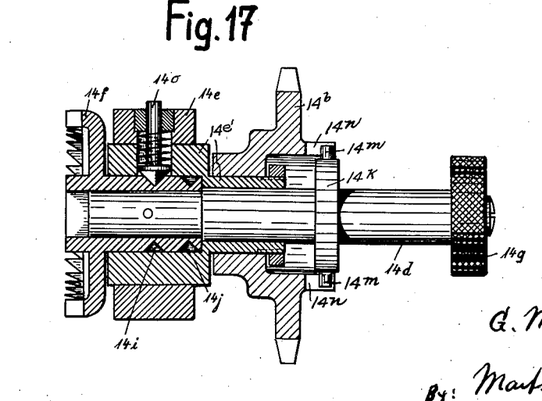
Figure 17 shows the driving and coupling means for the power operated cam shaft N of the typewriting mechanism partly in elevation and partly in section.

The lever 114, by means of which the clearance sign type lever 6 is struck, is not provided with a key but has a pin 121 which engages in the cam slot 99 formed in the lever 98. There is arranged below the pulling hook 108 the ratchet shaft "N" which is driven from the driving shaft 14 by a sprocket wheel 14a (Figs. 1 and 2) fixed thereon and a chain 14c driving a sprocket wheel 14b. The sprocket wheel 14b is rotatably but not slidably mounted on the stationary part 14e' of bearing 14e, Fig. 17. The spindle 14d which is rotatably and slidably mounted in the part 14e' carries on its left end the clutch portion 14f and on its right end the knob 14g. In the hollow hub of the sprocket wheel 14b, a collar 14k is fixed to the spindle 14d, carrying two pins 14m which protrude through slots n on the hub of the sprocket wheel 14b, whereby rotation is transmitted from the sprocket wheel 14b to the spindle 14d. The slots 14n are of such length that when the knob is pushed to the left, the clutch portion 14f is allowed to engage with the clutch portion 14h secured to one end of the ratchet shaft N, whereby the shaft N rotates in the direction of the arrow indicated in Fig. 2. The spindle 14d is locked in clutched and unclutched positions by a spring pin 14o which is adapted to engage in corresponding notches 14i and 14j.

The totalizers 55i and 55r are provided with cams 55a (Figs. 1, 4, 5) extending into the path of a pick-up mechanism secured by means of the screw 122 to the left cross footer 39. The pickup mechanism which substantially comprises a rod 123 extends at the other end through the medium of a screw 124 into a horizontal slot (not shown) of the front wall 37 of the calculating or actuator mechanism. The hook 125 is pivotally mounted by means of a pin 126 on the rod 123 of the pick-up mechanism (Fig. 11). At the point 125b of the hook 125 the hook 127 is pivotally mounted on the end 127a of which a wire spring 127b acts which is secured at 127c, Fig. 4, to the rod 123. In this manner, both hook 125 and hook 127 are maintained in their normal position, as shown in Figure 4, which is established by the hook 125 bearing on the pin 123a in a clockwise direction (Fig. 11). The normal position of the hook 127 is thus established by the latter bearing on the pin 123b in a clockwise direction. It is obvious that owing to the greater distance of the point of connection of the hook 125 from the engaging point of the spring 127b, the left end of the hook 125 is subjected to a greater spring action than the left end of the hook 127. This has the advantage that during the left movement of the paper carriage 4, the cams 55a of the totalizers are easily adapted to press the hook 127 downwardly, for which purpose the end 127' of the hook 127 is also suitably shaped. If the cam 55a of the respective totalizer has moved over the hook 127 it meets with resistance on the correspondingly shaped projection 125' of the hook 125 subjected to comparatively greater elasticity while at the same time the projection 127' of the hook 127 is adapted to bear behind the cam 55a of the totalizer. If the paper carriage 4 is now moved further to the left, it is obvious that the rod 123 will now be carried along and since the latter is secured at 122 to the cross footer 39 and the cross footers 39 and 40 are secured to the carriage 38b, these cross footers together with the carriage 38b will also be carried along against the action of the spring 38d. If during this left movement, the hook 125 bears with its part 125a on the pin 128 (Fig. 1) fixed to the machine frame, the hook 125 will be swung out as shown in Fig. 5, whereby it is released from the cam 55a of the corresponding totalizer so that the cross footers 39 and 40 together with the pick-up mechanism and the carriage 38b can return to their normal position on the right under the action of the spring 38d. By means of a locking member 129 (Fig. 4a) mounted on the left cross footer, the cross footers 39 and 40 may however also be held in their outermost left inoperative position (for the sake of simplicity, only one cross footer is shown in Fig. 5 and also in Fig. 4) in that the locking member 129 enters during its rocking movement in a corresponding groove or notch 130 of the bracket 38. In this position, which is shown in Fig. 5, the hooks 125 and 127 are also maintained in their inoperative position so that the cams 55a of the totalizers cannot engage therein.

There is also connected to the rod 123 by the screw 124 (Fig. 7) a lever 131 which is constantly urged on its rocking axis 124 counter-clockwise by a torsional spring 132. The position of the lever relative to the rod 123 is due to the fact that it has a lug 132a which bears against the rod 123. The lever 131 is provided at its free end with a groove 133.

There is also rotatably mounted on the spindle 48 (Fig. 3) a bridge 134, the rear member of which has a projection 134a bearing on the lever 47b. The member 134b of the bridge 134 is provided with a beveled edge 134c upon which the screw 124 is adapted to act.

By means of a screw 135 (Fig. 2) the carriage release lever 42 is adapted to pivot downwardly on the right side of the carriage frame, the carriage release rail 136 (Figs. 2 and 7) being secured to the extension 135a of the said carriage release lever 42. The rail 136 is connected at its other side to a lever 137 which is also connected on the left side of the carriage frame by a screw 135.

Figures 7, 8:
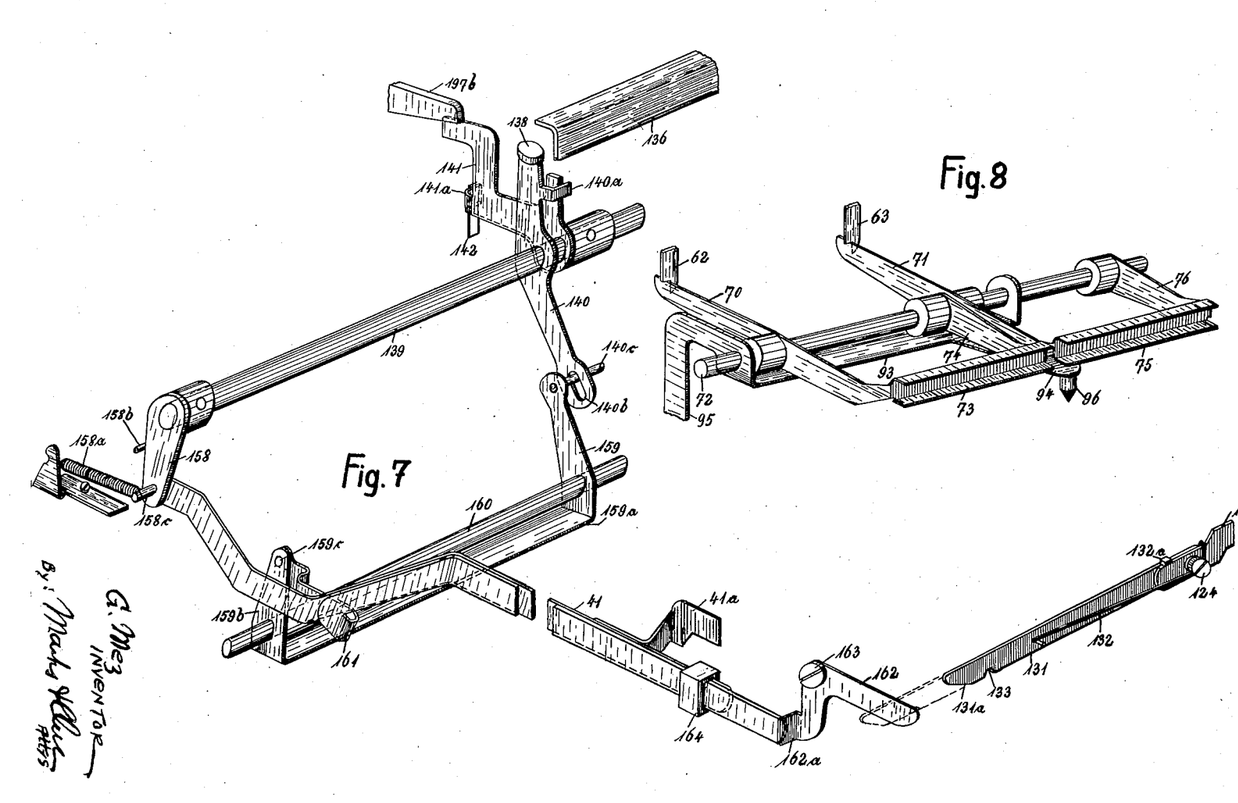
Figures 7 and 8 show in perspective details of the invention on an enlarged scale.
Figure 15:
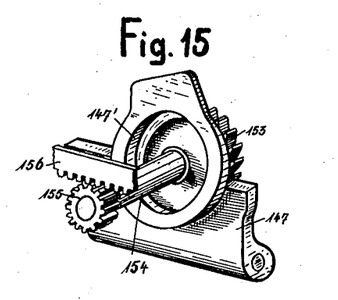
Figure 15 shows in perspective parts of the carriage escapement mechanism shown in Figure 10 but seen in the direction opposite to that in Figure 10.

During its pivoting movement, the carriage release rail 136 acts on a roller 138 (Fig. 7) of a lever 140 which is freely rotatable on a spindle 139 and a lug 140a upon said lever 140 extends into the plane of a lever 141. The lever 141 is fixed to the spindle 139 and is provided with a right-angular lug 141a (Figs. 7 and 10). There is secured to the lug 141a by means of the screw 142a a lug 142 which acts on the member 143a of the lever 143 adapted to rotate about the pivot 144. When the lever 141 pivots counter-clockwise, the lever 143 also pivots the holder 145 of the stepping dog 149 about the pivot 145a counter-clockwise. The projection 145c of the holder 145 bears normally under the action of the spring 145b against the abutment 146 which is secured by means of the screws 146a and 146b to the dog rocker 147. The stepping dog 149 is pivoted at 148 to the holder 145. When the holder 145 is swung out on the pivot 145a the stepping dog bears against the projection 146c formed on the part 146. There is rotatably mounted between the two center-points 150 and 151 (only one center-point is shown in Figure 10) the dog rocker 147 which carries the stepping dog 149 as well as the fixed dog 152. The latter is provided with an inclined surface or bevel 152a on which the teeth of the escapement wheel 153 are adapted to act. The escapement wheel 153 (Fig. 15) is secured to the shaft 154 rotatably mounted in the machine frame and is driven by a rack 156 secured to the paper carriage 4 in any suitable manner (for instance, by screws) the said rack engaging in a toothed wheel 155 which is also secured to the shaft 154. Since the shaft 154 extends through the dog rocker 147, a hole 147' (Fig. 15) is provided therein which is large enough so as not to prevent a free swinging out of the dog rocker 147. The arm 157 of the dog rocker 147 is oscillated from the moving type lever 6 as hereinafter fully described.

In the normal position, a tooth of the escapement wheel 153 lies on the stepping dog 149, while the fixed dog 152 is out of engagement with the escapement wheel 153. The briefly described carriage escapement shown in Fig. 10 is usually provided in the Mercedes typewriter of which there are many thousands on the market and is only described herein for the purpose of a better understanding of the invention.

There is secured on the left end of the spindle 139 (Fig. 7) the lever 158 which is constantly urged by a tension spring 158a connected thereto against an abutment 158b. The lever 158 is also connected by a pin 158c to the already mentioned rod 41 on which the lug 41a is provided (Figs. 3 and 7). The lever 140 (Fig. 7) has a slot 140b in which there extends a pin 140c secured to one arm of a U-shaped lever 159 having another arm 159b and a crosspiece 159a. The U-shaped lever 159 is adapted to rock on a spindle 160. The lever or arm 159b is connected by a pin 159c to a rod 161 of the shape shown which acts with its free end on a lug 162a upon a bell crank lever 162 which is adapted to pivot upon a screw 163 on the left side wall of the calculating mechanism. The horizontal member of the bell crank lever 162 is adapted to cooperate with the beveled end 131a of rod 131 and its slot 133 respectively. The two rods 41 and 161 are slidably mounted in a guide 164 provided on the machine frame.

There is also connected by a screw 165 to the already mentioned lever 45 (Fig. 3) a rod 166 which is connected with its other end at 167 to a bell crank lever 168a adapted to pivot on a spindle 168. A pin 169 secured to the horizontal member of the bell crank lever 168a engages in a slot 170 of a rod 171 acting through the parts 172 and 173 on a known automatic carriage return means, which will now be briefly described.

During the stepwise left hand movement of the carriage 4 in which movement the rail 56 (Fig. 1) attached to the carriage 4 (Fig. 2) participates the well known right margin adjuster Ra provided on the rail 56 abuts against the lug 174 (Fig. 3) of the rod 171 and carries it to the left against the action of the spring 171a. In this manner, the bell crank lever 172 is pivoted about point 172a counter-clockwise so that the U-shaped yoke or stirrup 173 is raised and thus releases the lever 175, the lever 175 connected to the lever 174a (Fig. 1) bearing with its projection 175a (Fig. 3) against the cross-piece 173a of the yoke 173. Consequently the lever 174a secured with the lever 176 Fig. 1 on the common rotatably mounted spindle 177 may then rock under the action of a torsional spring 178 counter-clockwise whereby the lever 176 is swung out in the same direction. The lever 176 engages with a pin 179 in an annular groove 180 of a constantly rotating clutch portion 181 and shifts the same (shown in Fig. 1) to the left so that its teeth enter into engagement with the clutch portion 182 thereby rotating the wheel 183 secured thereto. The wheel 183 drives the wheel 189 through means of the wheel gears 184, 185, 186, 187 Fig. 1 and 188 (Fig. 2). Since the wheel 189 engages with the rack 190, the carriage will therefore be brought back to its right end position. Shortly before the termination of the return movement of the carriage, the left margin adjusted Ri (Fig. 1) moves against an abutment or stop 175b (Fig. 3) of the rod 175d slidably mounted on the machine frame and connected at 175c to the lever 175 whereby the rod 175d (which was also previously moved to the left by the lever 175) is again moved to the right against an abutment or stop 175e on the frame while the lever 175 is also moved to the right and consequently the member 173 with its cross piece 173a can again drop in front of the projection 175a of the lever 175. During the movement of the lever 175 to the right, the lever 174a was of course also rocked clockwise whereby the clutch 181 and 182 over the parts 177 (Fig. 1) 176 and 179 is again opened and the return movement of the carriage interrupted.

The well known decimal tabulator key levers 191 are adapted to rock about a spindle 191a (Fig. 2) in the machine frame and carry on their front end the keys 43, while with their rear bifurcated end they are connected to tabulator rods 193 by means of the pins 192. The tabulator rods 193 are adapted to move vertically. At the lower end, the tabulator rods are guided by a bracket 194 arranged on the machine frame 1 and at the upper end, by a spindle 195 extending through longitudinal slots 193a of the tabulator rods said spindle 195 being mounted in extensions 196 formed on the left and right hand portion of the machine frame. The tabulator rods 193 are also provided with hook-shaped slots 193b. A member 197 is also adapted to rock on the spindle 195 and has a pin 197a which extends through all the slots 193b of the tabulator rods 193. A projection 197b of the member 197 cooperates with the lever 141 (Figs. 2 and 7). When depressing a decimal tabulator key 191, the lever 141 with its extension 142 also acts on the angle lever 143 (Fig. 10) thereby rocking the stepping dog 149 out of the path of the escapement wheel 153, according to which the carriage escapement mechanism is rendered inoperative.

The levers 199 carrying the locking beam 198 (Fig. 2), which is designated 19 in the aforesaid U. S. Patent 1,862,240, are secured to the rotatably mounted shaft 200. Now if the counting slide 32 during the downward movement acts with its bevel 201 on the locking beam 198, the shaft 200 will rock clockwise, whereby the unlocking lever 202 connected to the shaft 200 acts on the denominational locking lever 202a which happens to be in the computing position opposite lever 202. The purpose of the locking levers 202a is known and is therefore not fully described herein since its operation is fully described in U. S. Patent 1,270,471 on page 9. The locking levers are designated 234 and 239 in Figure 14 of the said patent. The spindle 200 also carries a lever 203 which cooperates with a lever 205 mounted on a spindle 204. When the shaft 200 turns, the lever 203 rocks clockwise and effects by means of the lever 205 a turning of the shaft 204 and a counter-clockwise rocking of the unlocking lever 206 secured to said shaft 204 and causes the unlocking of the cross footers.

The lever 206 has the same function as the lever 202 since it acts on the unlocking levers 206a of the cross footers which are quite similar to the unlocking levers 202a of the totalizers.

The operation of the invention is as follows:

By depressing a calculating key 19 the key lever 20 is rocked about 21 clockwise, whereby the member 20b of the key lever 20 is rendered inoperative relatively to the projection 28a formed on the latch 28 and consequently releases the latch 28. This latch 28 is now shifted by the spring 29 in the direction of the arrow b to such an extent that its projection 30 engages with the constantly rotating toothed wheel 18 and thereby couples the cam disk 27 with the same so that the cam disk participates in the rotation. At the same time, the hook-shaped extension 207a of the lever 207 slides down under the tension of the spring 208 on the top surface of the rail 26 until the extension 207a with its terminal 207b engages under the rail 26 at the last moment of the downward movement of the key lever 20, whereby the latter is maintained in its depressed position.

When the cam disk 27 begins to rotate, the roller 27a arranged thereon comes out of contact with the lever 27b, whereby the latter becomes free and rocks under the tension of the spring 27c clockwise until its one end bears against the rail 26. Prior to the completion of a revolution, the roller 27a comes in contact with the other end (in the form of a cam) of the lever 27b and rocks the same on its pivot 21 counter-clockwise against the action of the spring 27c engaging therewith until the roller 27a goes beyond the dead center 27d. From this moment, the lever 27b exerts a driving action on the roller 27a and on the cam disk 27, whereby a rotatory motion independent of the shaft 10 is imparted to the cam disk 27 and simultaneously effects a lead of the cam disk relative to the shaft 10 and the toothed wheel 18 respectively, thereby facilitating the uncoupling of the pawl 30 from the ratchet wheel 18.

Now, it may be recalled that, at this moment, the hook 207b of the lever 207 through the agency of the spring 208, is still held underneath the ledge 26. Consequently, the right-wardly bent lug 207c (Fig. 2a) of lever 207 is in the circumferential path of the leftwardly bent lug 28a of the pawl 28, rotating as a whole with the cam 27 in the direction of the arrow a (Fig. 2), while the end 20b of the key lever 20 is out of the circumferential path of the leftwardly bent lug 28a of the pawl 28. As a result, the lug 28a of the pawl 28 impinges against the lug 207c of the lever 207, thereby pushing the lever 207 with its hook 207b out of engagement with the lower side of the ledge 26, while at the same time the tooth 30 of the pawl 28 is also brought out of engagement with its ratchet wheel 18. If however, at this moment, the key 19 should still be held depressed by the operator, a re-engagement of the pawl 28 with the ratchet wheel 18 is not possible, owing to the fact that the lever 207 is not permitted to slide further to the right in Fig. 2, on account of the shaft 21, while on the other hand, the cams 27' and 27 are urged in the direction of the arrow a by means of the strong spring 27c through the parts 27b and 27a. Now, if the key 19 is released, the lug 207c of the lever 207 slides off from the lug 28a of the pawl 28, while at the same time the lug 20b of the lever 20 is moved into the circumferential path of the lug 28a of the pawl 28, which lug in connection with the strong spring 27c, through the intermediary of the parts 27b, 27a, 27' and 27 holds the pawl 28 out of engagement with the ratchet wheel 18. When the end 207c of the lever 207 slides off from the lug 28a of the pawl 28, the hook 207b comes in contact with the oblique face of the ledge 26, thus holding the lever 207, against the action of its spring 208 in its position of rest according to Fig. 2. If at the time, when the pawl 28 impinges against the end 207c of the lever 207, the operator has already released the key 19, the same movements will take place, the only difference being that the changing over of the lug 28a of the pawl 28 from the end 207c of the lever 207 to the end 20b of the lever 20 is effected, so to speak, without any interval.

Upon depression of a calculating key 19 the cam disk 27 participates in the rotation of the driving shaft 10 and consequently the corresponding counting slide 32 moves downward, the cam slot 34 thereof acts on the spindle 35 whereby the frame 210 and consequently the spindle 36 is rocked counter-clockwise in accordance with the value of the depressed key. The rocking movement corresponding to the value of the depressed key is effected in the known manner by the different inclination of the slots 34 of the various counting slides 32. For the purpose of transmitting this rocking movement to the counters, there is secured, as already stated to the spindle 36 a segment (not shown) which is designated 27 in U. S. Patent No. 1,862,240 and brings the value corresponding to the depressed key 19 into the totalizer and cross footer which is now in operative position. After a complete transmission of the value i. e. prior to the completion of the downward movement of the counting slide 32, the pin 32a arranged on the latter acts on the corresponding numeral writing key levers which are similar in shape to the clearance sign printing key lever 114 except that they are provided with keys S. It is obvious that parts similar to the parts 112, 108, 103 and 6 are also coordinated to each of the said numeral writing key levers. However, none of the counting slide pins 32a acts on the clearance sign printing key lever 114. It it therefore obvious that when the pin 32a acts on the corresponding writing key lever the corresponding type lever will strike against the platen 3 whereby the value inserted is printed. In this manner, the type lever acts on the universal bar 211 and moves it in the direction of the arrow g. The lever 212 is thereby rocked on its fixed pivot 212a counter-clockwise and consequently the rod 213 is drawn in the opposite direction of the arrow g whereby the dog rocker 147 is rocked by the arm 157 (Fig. 10) about the center points 150 and 151 against the action of the compression spring 157a. In this manner, the stepping dog 149 becomes disengaged from the escapement wheel 153 and the fixed dog 152 becomes engaged therewith, the loose ratchet tooth 149 swinging upwards about the spindle 148 under the action of a spring.

When the type lever 6 has struck the platen 3, the tension spring 109 engaging with the pulling lever 108 returns the type lever 6 to its normal position whereby the dog rocker 147 also returns to its normal position under the action of the compression spring 157a. The carriage pulling spring then acts on the paper carriage 4 and the rack 156 secured thereto, which drives the escapement wheel 153 by means of the wheel 155 and the spindle 154 in the direction of the arrow indicated in Fig. 10 while the stepping dog 149 which has meanwhile returned with the dog rocker 147 to the normal position engages in the next tooth-space of the escapement wheel 153 so that the paper carriage 4 is advanced one step for printing the next letter.

During this stepwise movement of the carriage from right to left, the cam 55a of the totalizer 55i now entering the operative position has operative connection with the hook 125 of the cam operating mechanism 123 whereby the cross footers 39, 40 are carried by the carriage 4 until the respective totalizer for instance 55i again moves out of the operative position, which takes place in the following manner.

Figures 4, 5:
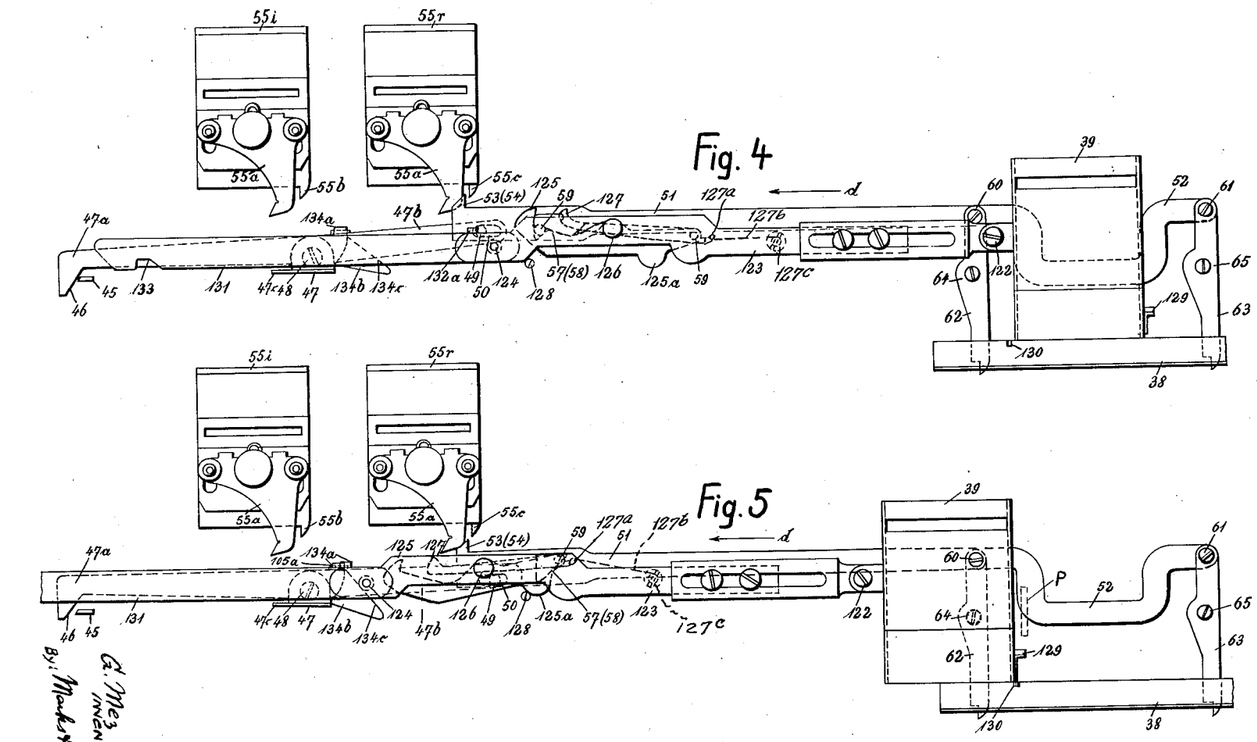
Figure 4 is a view towards the pick-up means for the cross footers in operative position.
Figure 5 is a view of the pick-up means shown in Figure 4 in inoperative position.
Figures 4A, 11, 12, 13, 14:
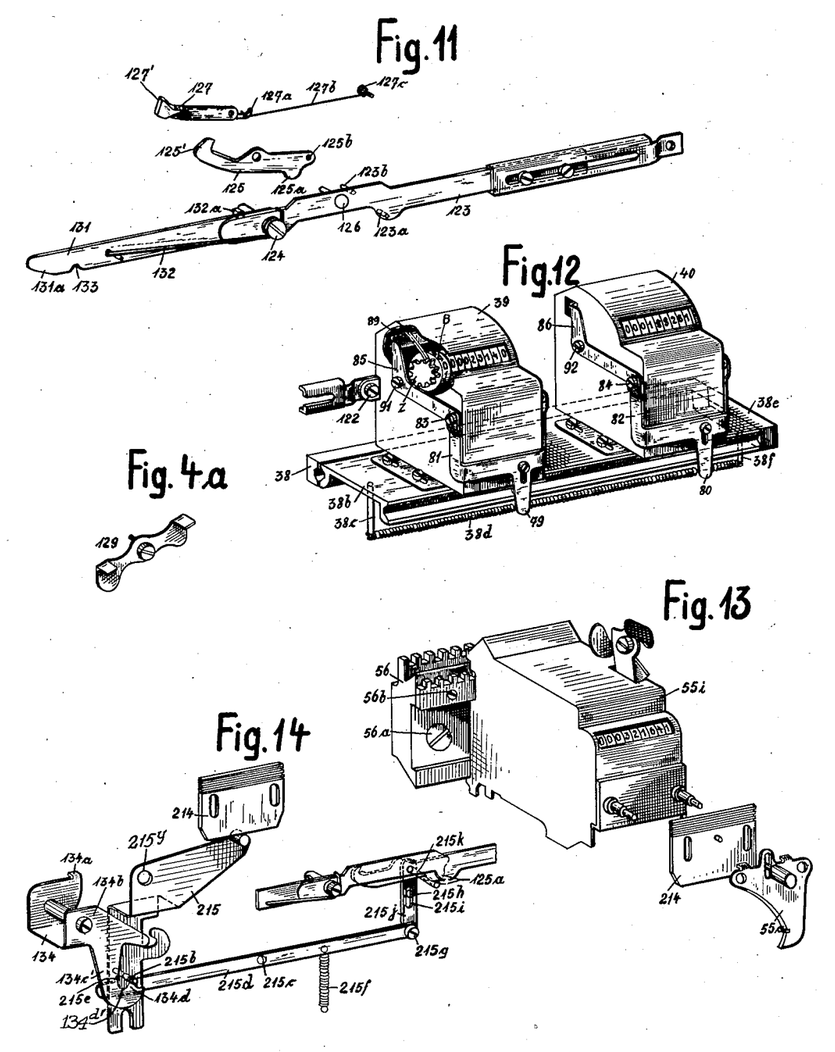
Figure 4a shows a perspective view of the cross footer locking dog.
Figure 11 shows in perspective the pick-up means for the cross footers, some parts being shown separately for the sake of clearness.
Figure 12 shows in perspective the cross footer carriage with the cross footers secured thereto, a part of the left cross footer being shown broken away for uncovering some sections.
Figure 13 shows the suspending rail for the totalizers which is secured to the paper carriage, together with a totalizer, in perspective, some parts being shown separately for the sake of clearness.
Figure 14 shows in perspective the mechanism operated by the totalizers.

When writing the value which is in the unit position of the cross footer 39 the pin 128 (Fig. 5) arranged on the machine frame 1 acts in consequence of the movement of the carriage on the elevation 125a of the pick-up hook 125 and swings the latter into the position shown in Figure 5 whereby the pick-up mechanism 123 and the cross footers 39 and 40 are released from the cam 55a and can return to their normal position shown in Figure 1. By the movement of the carriage which is caused when writing the value which is in the unit position, the projection 55b of the totalizer 55i also acts on the projection 53 of the lever 51 and leads the latter to the left, whereby the lever 62 releases the lever 70 so that the springs 87 (Figure 2) can act on the rake-like contacting rail 89. The latter cooperates with the driving wheels Z of the totalizer wheels B (Fig. 2) wherein, as stated, that tooth is shortened which in the zero position of the totalizer wheels B lies opposite the rail 89 whereby a complete swinging out of the rail 89 is then possible. This swinging out of the rail 89 is therefore only possible when the shortened teeth of all wheels Z are opposite thereto i. e. only when all totalizer wheels B are at zero.

If, after copying the value standing on the cross footer, the cross footer 39 is at zero, the springs 87 are adapted to completely swing the member 89 clockwise. Consequently, the slide 81 moves downward and swings the yoke on the axis 72 clockwise (Fig. 2) the said yoke comprising the U-rail 73 and the levers 70 and 74. In this manner, the lever 74 acts on the arm 94 of the levers 93, 95 and 98 and also rocks the same clockwise so that the cam slot 99 of the lever 98 acts on the lever 114 and presses it downward against the action of its spring 119 whereupon the pawl 112 positively connected to the key lever 114 causes the pulling hook 108 to engage in the known manner with the ratchet shaft N constantly rotating in the direction of the arrow n. The intermediate lever 103 is thereby swung out on the axis 104 clockwise and thus effects the striking of the type lever 6 bearing the clearance sign against the platen 3 whereby the clearance sign is printed.

During this operation, however, the rod 100, which is connected to the lever 95, has also been moved by the clockwise swinging movement of the lever 95 in the direction of the arrow x (Fig. 2) to such an extent that the bifurcated end of the rod is moved by the pin 102 on the intermediate lever 103, during the carrying along of the pulling hook 108, by the cam shaft N contrary to the direction of the arrow x, whereby the member 89 is returned by means of the elements 95, 93, 94, 74, 73, 77, 79, 81 and 85 to its normal position shown in Figure 2, the springs 87 being again tensioned and the lever 62 again engaging over the lever 70.

The clearance sign printing means is of course also operated in the same manner by the action of the projection 55c of the totalizer 55r on the rod 52.

When the rod 51 is guided to the left by the projection 55b of the totalizer 55i in the direction of the arrow d, the projection 53 is released, after the totalizer has caused a movement of the carriage, from the projection 55b of the totalizer 55i in consequence of the bevel or inclined surface 51a of the triangular groove 57 coming in contact with the pin 59, whereby the parts 51, 62 can return to their normal position under the action of the spring 66. The same of course also applies to the projection 55c of the totalizer 55r and the rod 52.

If the clearance sign has now been printed, the margin adjuster Ra will abut, during the further stepwise left movement of the carriage, against the lug 174 (Fig. 3) of the rod 171, as already stated, whereby the return movement of the carriage will take place.

It is obvious from the above description that during a movement of the carriage from right to left the cross footers 39 and 40 are automatically carried along.

As soon as the value in the units position of the totalizers 55i and 55r has been inserted, the subsequent letter feed movement renders the clearance sign printing mechanism operative while the further stepwise left movement of the carriage renders the carriage return mechanism operative, which mechanism moves the carriage from left to right. During this carriage movement from left to right, however, the said mechanisms are not rendered operative on account of the fact that the cam hook 125, the levers 51 and 52 and the lever 171 are merely forced downwardly by their corresponding cams 55a, 55b, 55c and the margin adjuster Ra without exerting any effects.

It is however desirable in many cases, for instance, during the free left movement of the paper carriage 4 which occurs when depressing the carriage release lever 42 that the movement of the carriage is not rendered effective on these mechanisms since otherwise a clearance sign may be unintentionally printed or a carriage return movement may take place and the cross footers carried along unnecessarily. As it is obvious from the preceding description that the clearance sign is printed in any position of the cross footers relatively to the bracket 38 when they are at zero and it is usual to lock the cross footers, when not used, by means of the locking lever 129 in their left position, as shown in Fig. 5, outside their driving wheels P (Figure 5), it appears desirable in consequence of the complete left movement of the cross footer or cross footers to also render the clearance sign printing means and the pick-up mechanism inoperative.

However, when depressing the tabulator key it is desirable, as is subsequently elucidated, to render the left movement of carriage inoperative only on the carriage return means and the clearance sign printing means but not on the pick-up mechanism.

These effects are brought about in the following manner.

Owing to the depression of the carriage release lever 42 (Fig. 2) this lever 42 and also the lever 137 are rocked on the pivots 135 and thereby the carriage release rail 136 (Fig. 7) is moved rearwardly. This rail 136 acts upon the roller 138 on the lever 140 and pivots the latter on the axle 139. Owing to the pin and slot connection 140b, 140c, the lever 140 acts on the yoke 159, which is thereby pivoted clockwise on the axle 160 and the rod 161 which is connected to the member 159b by the pin 159c is moved forward. The rod 161 acts on the lug 162a of the lever 162 so that the same is pivoted on its axis 163 in such a manner that it extends into the moving path of the rod 131.

Moreover, the lever 140 when pivoting acts with its lug 140a on the lever 141 which is consequently swung out in the same direction. The lever 141 (Fig. 10) with its lug 141a and the part 142 secured thereto by the screw 142a acts on the lever 143 and pivots the latter clockwise (Fig. 10) whereby the stepping dog 149 becomes disengaged from the escapement wheel 153 so that the carriage 4 is no longer hindered in its movement and can move freely to and fro.

Moreover, owing to the swinging movement of the lever 141 the axle 139 secured thereto is also rocked, whereby the rod 41 is moved by the lever 158 forwardly. The rod 41 with its lug 41a (Figs. 3 and 7) acts on the lever 45 and rocks the latter on its axis 44a whereby the lever 166 is moved to the left by means of the screw 165 and the bell crank lever 168a is swung out clockwise. Owing to the pin 169 engaging in the slot 170 of the rod 171, the free end thereof is moved downwardly whereby the lug 174 is brought out of the path of the margin adjuster Ra so that the latter can no longer actuate the carriage return means.

When the lever 45 rocks clockwise, this lever acts against the bevel or inclined surface 46 of the lever 47, 47a, 47b and rocks the latter against the action of the spring 47d clockwise, while the pin 49 of its arm 47b acts on the levers 51 and 52 and rocks the latter about the centers 60 and 61 downwardly so that they come out of the moving path of the projections 55b and 55c of the totalizers 55i and 55r.

Since during the movement of the carriage 4 from right to left, the cam projection 55a enters into engagement with the projection 125 (Fig. 4) the cross footers 39 and 40 will be carried to the left in the above described manner. Since, however, the rod 131 (Fig. 7) also participates in this movement, the rod with its bevel or inclined surface 131a comes in contact with the raised lever 162 and is thereby swung about the screw 124 against the action of the spring 132. At the moment when the projection 125 becomes disengaged from the cam 55a in the above described manner, the lever 131 with its groove 133 engages the lever 162 by the action of the spring 132 whereby the cross footers 39 and 40 are prevented from returning to their normal position (right position) and consequently all cam projections 55a of the totalizers 55i and 55r cannot affect the hook 125. While the carriage release lever 42 is depressed, the paper carriage 4 is adapted to move freely to the left and right without having any influence on the mechanisms (which are usually dependent on its movement) such as the carriage escapement means, carriage return mechanism, clearance sign printing means and pick-up mechanism for the cross footers.

Upon releasing the carriage release lever 42 again, the escapement mechanism shown in Figure 10 is again brought into the operative position i. e. the stepping dog 149 again engages with the escapement wheel 153 and the carriage release rail 136 simultaneously releases the roller 138 and the lever 141 respectively so that the lever 141 and the lever 140 as well as the yoke 159, 159a, 159b and the rod 161 swing back to their normal position by the action of the spring 158a on the lever 158. The bell crank lever 162 comes out of engagement with the groove 133 of the rod 131 so that the cross footers 39, 40 together with the pick-up mechanism 123 also return to their normal position. The rod 41 as well as the parts 41a (Fig. 3) 45, 47a, 47, 47b, 51, 52, 166, 168a, 171 also return to their normal position under the action of the spring 158a so that the carriage return mechanism and also the rods 51 and 52 for the clearance sign printing means again assume their normal position.

While during the depression of the carriage release key 42, all the mechanisms are rendered inoperative, only the carriage return means and the clearance sign printing means together with the carriage escapement are rendered inoperative when depressing a decimal tabulator key 43 while the pick-up mechanism for the cross footers is not rendered inoperative. The above is necessary for the following reasons.

Figures 3, 6, 9:
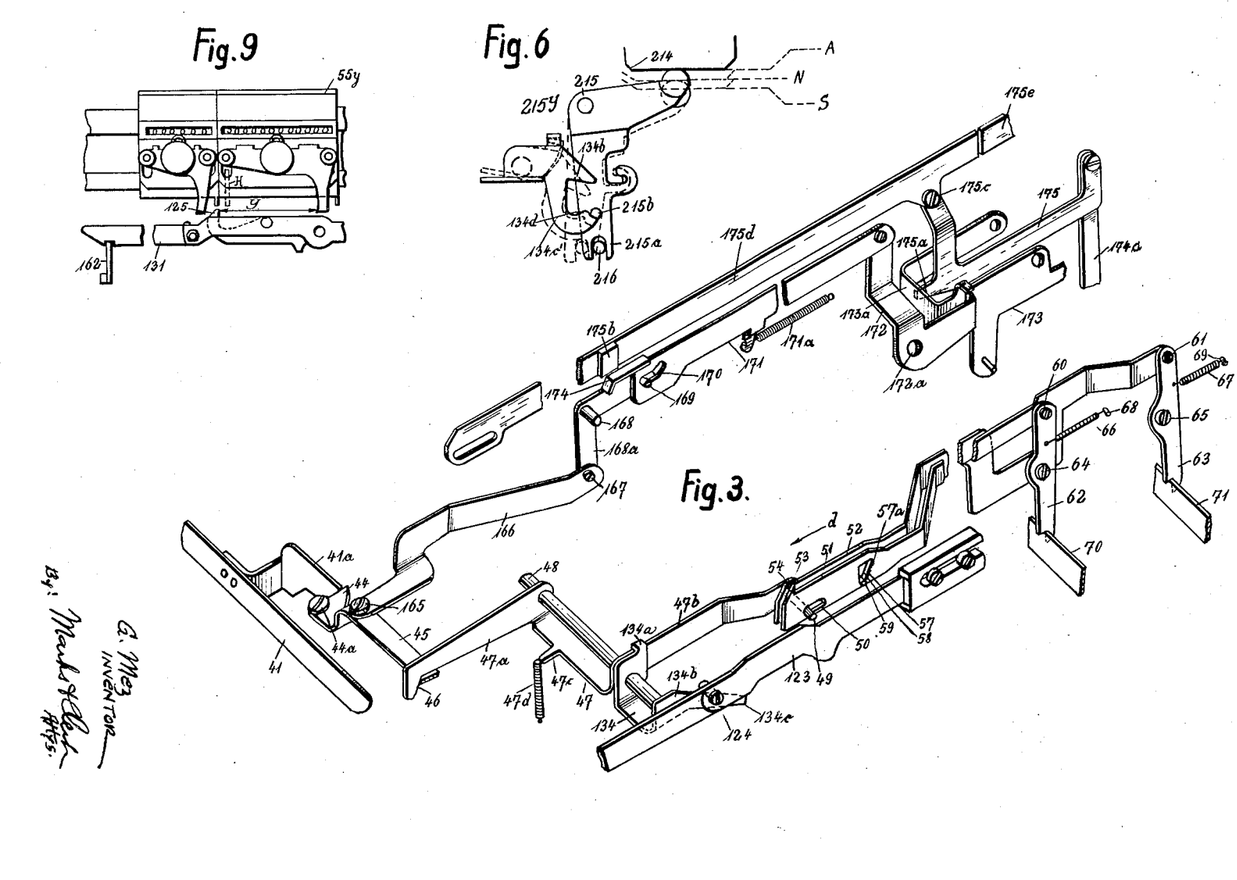
Figure 3 is a perspective view of the pick-up means for the cross footers, the controlling mechanism for the clearance sign printing means and the controlling mechanism for the carriage return means.
Figure 6 shows a modified form of a detail of the invention.
Figure 9 shows diagrammatically a special position of two vertical totalizers in relation to the pick-up means.

If when depressing a decimal tabulator key 43 the pick-up means 125 were rendered inoperative, i. e. maintained by hook 131 and lever 162 in their left position as shown in Figure 9 and furthermore if the depressed decimal tabulator key 43 were for instance that which brings the totalizer 55y shown in Fig. 9 with its highest decimal point in the working position i. e. opposite the main driving wheel H, the hook 125 with the cross footers 39 and 40 could only return to their right position when the decimal tabulator key 43 is released and then be carried along by the counting mechanism. The comparatively long distance y from hook 125 to the cam projection 55a of the counting mechanism 55y must be covered.

If, as in connection with rapid operators, a calculating key 19 is struck directly after the release of the decimal tabulator key 43, the corresponding value will be inserted, during the return of the cross footers 39 and 40 on the long distance y into the calculating mechanism whereby the cross footer will be damaged or if this does not occur the inserted value will enter the wrong place of corresponding cross footer. If, however, when depressing the decimal tabulator key 43, the pick-up means is not rendered inoperative, the hook 125 is adapted to jump during the movement of the tabulator i. e. during the depression of the decimal tabulator key 43 from one totalizer to the other totalizer.

The means which, when depressing a decimal tabulator key 43 prevents the pick-up means being rendered inoperative, operates in the following manner:

If a decimal tabulator key 43 (Fig. 2) is depressed, the tabulator key lever 191 swings on its axis 191a and moves the corresponding rod 193 upwardly. In this manner, the rod with its inclined slot 193b acts on the pin 197a of the part 197 and swings the same on the axis 195 clockwise. During this movement, the part 197 with its projection 197b acts on the lever 141 (Fig. 7) and rocks the same. The shaft 139 is rotated and the lever 158 is thereby rocked counterclockwise. The rod 41 is thus moved forwardly and the carriage return means and the clearance sign printing means are thereby rendered inoperative. The lever 140 loosely mounted on the axle 139 and also the yoke 159, the rod 161 and the lever 162 are however not actuated so that in this case the pick-up means and the cross footers 39 and 40 respectively are not arrested in their left position but are moved to the right by each totalizer. If the totalizer has left the working position of the machine, the cross footers return to their normal position under the tension of the tension spring in order to be carried again by the next totalizer.

In order that when making calculations wherein the cross footers 39 and 40 are not employed, the latter may be kept inoperative, the known reversing gear (not shown and which is designated 171, 172 in U. S. Patent 1,270,471) for the main driving wheel P (Fig. 5) may be placed at "neutral" so that no values would be transferred therein. The cross footers 39 and 40 would however be constantly carried by the totalizers 55i and 55r unnecessarily. In order to avoid these unnecessary movements of the cross footers 39 and 40, the cross footers 39 and 40 are moved out of the position shown in Figure 4 into the left position shown in Fig. 5 (for the sake of clearness only the cross footer 39 is shown in Figs. 4 and 5) and locked in the said position by a latch 129 (Fig. 4a) provided on the cross footer 39 and engaging in a notch 130. As is obvious from a comparison of Figs. 4 and 5, the pick-up hook 125 has then its rear member 125a contacting with the pin 128 whereby the pick-up hook 125 is held in its inoperative position (shown in Fig. 5) and the cam hooks 55a of the totalizers 55b and 55c cannot engage the said pick-up hook 125 during the movement of the paper carriage. However, during the said movement of the cross footers to the left, the screw 124 (Fig. 3) provided on the pick-up mechanism also moves at the same time onto the inclined edge or bevel 134c of the member 134, 134b, whereby the same is rocked about the axis 48 clockwise and acts with its lug 134a on the lever 47b so that the latter also swings against the action of the spring 47d clockwise and with its pin 49 brings the levers 51 and 52 out of the position shown in Fig. 4 into the position shown in Fig. 5 wherein the projections 53 and 54 are located outside the moving path of the projections 55b and 55c and consequently the clearance sign printing means is also rendered inoperative.

Rendering the cross footer inoperative consists in shifting the cross footer into the non-working position shown in Fig. 5 and latching there but it is also understood that any other mode of rendering the cross footer inoperative may be used.

It may for instance also be rendered inoperative by placing the reversing gear belonging thereto at "neutral" as already stated. This is preferably effected automatically by cams 214 (Figs. 6, 13 and 14) arranged on the totalizers 55i and 55r acting on a bell crank lever 215 which is pivotally mounted at 215y and engages with its fork 215a around the bolt 216 controlling the reversing gear not shown, since the function thereof is sufficiently known from the aforesaid U. S. Patent 1,270,471. However, it may be stated that when setting the cam 214, adjustable by the totalizers, in the position designated "A" in Figure 6, the said reversing gear is shifted over the bell crank lever 215 so that the wheel P rotates in such a manner that the cross footers add. If the cam 214 is placed at "N", the wheel P remains inoperative while when setting the cam 214 at "S" the wheel P rotates so that the cross footers subtract. There is riveted to the bell crank lever 215 a pin 215b, which is adapted to act on an arm 134c mounted on the arm 134b of the member 134, 134a.

If, for instance, a totalizer 55 assumes the operative position and its controlling cam 214 is placed at "neutral", the lever 215 will be swung into the position shown in Fig. 6 by dotted lines and in Fig. 14 by solid lines, wherein the pin 215b moves on to the elevation 134d of the arm 134c' so that this arm as well as the part 134, 134b are swung out into the dotted position while the latter with its lug 134a renders the clearance sign printing means inoperative as described above.

It is obvious that in the same manner the pick-up hook 125 may also be swung out by the lever 215 into the inoperative position shown in Fig. 5 without it being necessary to shift the cross footer into the position shown in Fig. 5.

For this purpose, a lever 215d is connected to the machine frame at point 215c and is provided with a lug 215e similar to the lug 134d of the arm 134c', the pin 215b being also adapted to engage with the lug 215e. If the cam 214 of any cross footer is placed at "N" the lever 215d will be swung against the action of its spring 215f whereby the part 215j connected at the point 215g and adapted to slide by means of a pin and slot joint 215h, 215i is raised and thus acts with its pin 215k on the part 125a of the hook 125 whereby this hook with the hook 127 is swung into the inoperative position shown in Fig. 5.

If, however, the cam 214 is in its subtraction position, the lever 215 will be rotated still further in clockwise direction. Accordingly the pin 215b of lever 215 is moved beyond the lug 134d into the recess 134d' and beyond the lug 215e of lever 215d, in which position the disabling means remain inoperative. They are only made momentarily operative when pin 215b is passing over lugs 134d and 215e, which operation is without any importance, since this operation takes place immediately when cam 214 begins to act on lever 215, the pin 215b of which is thereby shifted simultaneously beyond the lugs 134d and 215e.

I claim:

1. A mechanism for typewriter calculating machines and the like including means for manually adjusting the position of the carriage, a carriage return means, means for rendering the carriage return means inoperative, a plurality of crossfooters, one clearance sign printing mechanism for said plurality of crossfooters, controlling connections between each of said crossfooters and said clearance sign printing mechanism, a common member for rendering said controlling connections inoperative, and common means for operating said member and said means for rendering the carriage return means inoperative, said common means operating while said carriage positioning means is operated.

2. A mechanism for typewriter calculating machines and the like including clearance sign printing mechanism, crossfooters, a carriage, totalizers, means for testing the clearance condition of the crossfooters and controlling said clearance sign printing mechanism, abutments upon the totalizers, said testing and controlling means including trip levers, pawls having their longitudinal axes disposed parallel to the direction of the carriage for being carried along by said abutments to actuate said trip levers, and means for shifting said pawls out of the path of said abutments.

3. A mechanism for typewriter calculating machines and the like including a clearance sign printing mechanism, crossfooters, means for testing the clearance condition of the crossfooters and initiating the operation of said clearance sign printing mechanism, means for rendering the testing and operation initiating means inoperative, means for locking the crossfooters in inoperative position, and connecting means between said crossfooters and said means for rendering the testing and operation initiating means inoperative, said connecting means operating said means for rendering the testing and operation initiating means inoperative when said crossfooters are locked in inoperative position.

4. A mechanism for typewriter calculating machines and the like including a carriage escapement, carriage return means, clearance sign printing means, crossfooters, means for testing the clearance condition of the crossfooters and controlling said clearance sign printing mechanism, pick-up mechanism for the crossfooters, means for rendering inoperative the carriage escapement, means for rendering inoperative the carriage return means, means for rendering inoperative the testing and controlling means, means for rendering inoperative the pick-up mechanism for the crossfooters, a control member operating said first three inoperative rendering means, a carriage release lever, a lever operative by said carriage release lever for operating said control member and also adapted to operate the means for rendering inoperative the pick-up mechanism for the cross footers.

5. A mechanism for typewriter calculating machines and the like including a carriage return mechanism, a clearance sign printing mechanism, crossfooters, means for testing the clearance condition of the crossfooters and controlling said clearance sign printing mechanism, means for rendering inoperative the carriage return mechanism, means for rendering the testing and controlling means inoperative, a control member for both of said inoperative rendering means, a lever in rigid connection with said control member, and connecting means between said lever and said means for rendering inoperative the carriage return mechanism and said means for rendering the testing and controlling means inoperative.

6. A mechanism for typewriter calculating machines and the like including clearance sign printing mechanism, crossfooters, releasable means for testing the clearance condition of the crossfooters and controlling said clearance sign printing mechanism, a carriage, carriage positioning means, means for rendering the testing and controlling means inoperative and controlled by said carriage positioning means, totalizers on said carriage, abutments upon the totalizers, pawls having their longitudinal axes disposed parallel to the direction of movement of the carriage, one end of each pawl being connected to said testing and controlling means the free end of each pawl being carried along by said abutments for releasing said testing and controlling means, said free ends being connected by a pin and slot connection to said inoperative rendering means controlled by said carriage positioning means whereby said pawls may be removed vertically to their longitudinal axes from the path of said abutments.

7. A mechanism for typewriter calculating machines and the like including clearance sign printing mechanism, crossfooters, releasable means for testing the clearance condition of the crossfooters and controlling said clearance sign printing mechanism, a carriage, carriage positioning means, means for rendering the testing and controlling means inoperative and controlled by said carriage positioning means, totalizers on said carriage, abutments upon the totalizers, pawls having their longitudinal axes disposed parallel to the direction of movement of the carriage, one end of each pawl being connected to said testing and controlling means the free end of each pawl being carried along by said abutments for releasing said testing and controlling means, said free ends being connected by a pin and slot connection to said inoperative rendering means controlled by said carriage positioning means, whereby said pawls may be removed vertically to their longitudinal axes from the path of said abutments, and a fixed pin cooperating with control openings in said pawls when the latter are carried along by said abutments, whereby said pawls are released from said abutments after having tripped said testing and controlling means.

8. A mechanism for typewriter calculating machines and the like including clearance sign printing mechanism, crossfooters, releasable means for testing the clearance condition of the crossfooters and controlling said clearance sign printing mechanism, a carriage, carriage positioning means, means for rendering the testing and controlling means inoperative and controlled by said carriage positioning means, totalizers on said carriage, abutments on said totalizers, pawls having their longitudinal axes disposed parallel to the direction of movement of the carriage, one end of each pawl being connected to said testing and controlling means, the free end of each pawl being carried along by said abutments for releasing said testing and controlling means, said free ends being connected by a pin and slot connection to said inoperative rendering means controlled by said carriage positioning means whereby said pawls may be removed vertically to their longitudinal axes from the path of said abutments, and a fixed pin cooperating with control openings provided in said pawls, said control openings being of such configuration and said pin so positioned therein that upon a movement of the pawls in direction at right angles to the longitudinal axes thereof the fixed pin is ineffective upon said control openings, while when the pawls are engaged by said abutments said pin and control openings will cause a movement of the pawls at right angles to the longitudinal axes thereof when said pawls are moved in the direction of their longitudinal axes, whereby said pawls are caused to be released from said abutments after having tripped said testing and controlling means.

9. A mechanism for typewriter calculating machines and the like including clearance sign printing mechanism, crossfooters, means for testing the clearance condition of the crossfooters and controlling said clearance sign printing mechanism, means for rendering said testing and controlling means inoperative, a carriage, totalizers on said carriage, abutments on said totalizers, carriage positioning means, pawls having their longitudinal axes disposed parallel to the direction of movement of the carriage, one end of each pawl being connected to said testing and controlling means the free end of each pawl cooperating with said abutments and being connected to said inoperative rendering means, said inoperating rendering means including a pivoted member for moving said pawls at right angles to their longitudinal axes, and means actuated by the carriage positioning means for actuating said pivoted member.

10. A mechanism for typewriter calculating machines and the like including clearance sign printing mechanism, crossfooters, releasable means for testing the clearance condition of the crossfooters and controlling said clearance sign printing mechanism, a carriage, carriage positioning means, means for rendering said testing and controlling means inoperative and controlled by said carriage positioning means, totalizers on said carriage, abutments on said totalizers, pawls having their longitudinal axes disposed parallel to the direction of movement of the carriage, one end of each pawl being connected to said testing and controlling means the free end of each pawl being engageable by said abutments to be carried along for releasing said testing and controlling means, said free ends being connected by a pin and slot connection to said inoperative rendering means, controlled by said carriage positioning means whereby said pawls may be removed from the path of said abutments, control openings in said pawls, said control openings being of triangular configuration with the hypotheni of said triangular openings averted from the direction of the carriage feed, and a fixed pin cooperating with said hypotheni edges on the carrying along of said pawls to release the same from said abutments after said pawls have released said testing and controlling means.

11. A mechanism for typewriter calculating machines and the like including a carriage, a carriage positioning means, clearance sign printing mechanism, crossfooters, releasable means for testing the clearance condition of the crossfooters and controlling said clearance sign printing mechanism, means functioning while said carriage positioning means is being actuated for rendering the testing and controlling means inoperative, totalizers on said carriage, abutments arranged in different planes on said totalizers, pawls having their longitudinal axes disposed parallel to the direction of movement of the carriage, one end of each pawl being connected to said testing and controlling means and their free ends connected to said inoperative rendering means, said pawls having noses lying in front of each other and in the planes of said abutments, said abutments being adapted to operate one of said pawls at a time for tripping the respective testing and controlling means for said clearance sign printing mechanism.

12. A mechanism for typewriter calculating machines and the like including carriage positioning means, clearance sign printing mechanism, crossfooters, totalizers, releasable means for testing the clearance condition of the crossfooters and controlling said clearance sign printing mechanism, abutments upon the totalizers, means cooperating with said abutments and connected to said testing and controlling means for releasing the latter, and means controlled by said carriage positioning means and connected to said cooperating means to render the latter inoperative while the carriage positioning means is being operated.

GUSTAV MEZ.